(12) United States Patent
Ossian

(10) Patent No.: US 8,182,714 B2
(45) Date of Patent: May 22, 2012

(54) CRITICAL LEVELS OF GLYCERIN BALANCED WITH SALT FINES FOR DE-ICING SALT

(75) Inventor: Kenneth C. Ossian, Bettendorf, IA (US)

(73) Assignee: Ossian, Inc., Davenport, IA (US)

( * ) Notice: Subject to any disclaimer, the term of this patent is extended or adjusted under 35 U.S.C. 154(b) by 0 days.

(21) Appl. No.: 13/156,038

(22) Filed: Jun. 8, 2011

(65) Prior Publication Data

US 2011/0248207 A1    Oct. 13, 2011

Related U.S. Application Data

(63) Continuation-in-part of application No. 11/958,164, filed on Dec. 17, 2007.

(51) Int. Cl.
*C09K 3/18* (2006.01)
(52) U.S. Cl. .............................. 252/70; 106/13; 428/403
(58) Field of Classification Search .................... 252/70; 106/13; 428/403
See application file for complete search history.

(56) References Cited

U.S. PATENT DOCUMENTS

| | | | |
|---|---|---|---|
| 4,426,409 A | 1/1984 | Roe | |
| 4,501,775 A | 2/1985 | Parks et al. | |
| 5,599,475 A | 2/1997 | Ossian et al. | |
| 5,651,915 A | 7/1997 | Ossian et al. | |
| 5,683,619 A | 11/1997 | Ossian et al. | |
| 5,876,621 A | 3/1999 | Sapienza | |
| 5,980,774 A | 11/1999 | Sapienza | |
| 5,993,684 A | 11/1999 | Back et al. | |
| 6,039,890 A | 3/2000 | Ossian et al. | |
| 6,129,857 A | 10/2000 | Sapienza | |
| 6,416,684 B1 * | 7/2002 | Bloomer | 252/70 |
| 6,506,318 B1 | 1/2003 | Sapienza | |
| 6,540,934 B2 | 4/2003 | Sapienza et al. | |
| 6,544,434 B2 | 4/2003 | Sapienza | |
| 6,843,931 B2 | 1/2005 | Sapienza | |
| 6,890,451 B2 | 5/2005 | Sapienza et al. | |
| 7,122,127 B1 | 10/2006 | Ossian | |
| 7,126,032 B1 * | 10/2006 | Aiken | 568/869 |
| 7,276,178 B1 | 10/2007 | Ossian | |
| 7,309,451 B2 | 12/2007 | Koefod | |
| 7,473,379 B2 | 1/2009 | Ossian et al. | |
| 7,507,349 B2 | 3/2009 | Koefod | |
| 2005/0065337 A1 | 3/2005 | Werpy et al. | |

OTHER PUBLICATIONS

Derwent-Acc-No: 2007-A71396, abstract of RU 2302441C1 (Jul. 2007).

* cited by examiner

*Primary Examiner* — Anthony J Green
(74) *Attorney, Agent, or Firm* — McKee, Voorhees & Sease, P.L.C.

(57) ABSTRACT

Solid ice melters are improved with a small exterior coating of glycerin which prevents caking and bridging and enhances melt value.

10 Claims, 1 Drawing Sheet

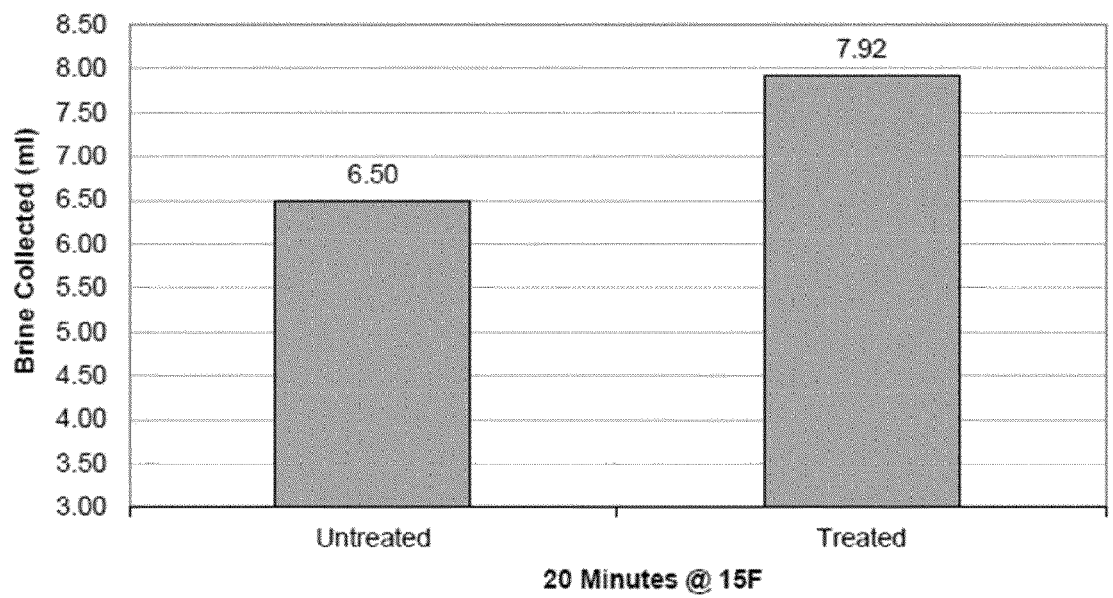

CRITICAL LEVELS OF GLYCERIN BALANCED WITH SALT FINES FOR DE-ICING SALT

CROSS-REFERENCE TO RELATED APPLICATIONS

This application is a Continuation-in-Part application of U.S. Ser. No. 11/958,164 filed Dec. 17, 2007, herein incorporated by reference in its entirety.

FIELD OF INVENTION

This invention relates to de-icing and ice melting compositions in reducing ice and snow on surfaces.

BACKGROUND OF THE INVENTION

De-icing compositions are widely used in northern areas of the country, particularly in northern climates subject to heavy ice and snow conditions in the winter months. The inventor of the present composition has numerous patents on ice melters. See, for example, U.S. Pat. No. 7,122,127, which relates to liquid ice melters, and U.S. Pat. No. 5,683,619 which relates to solid ice melting compositions which are environmentally friendly. The disclosure of these patents is incorporated herein by reference.

A good ice melter for roads, sidewalks, parking lots, etc. is inexpensive, easy to manufacture, effective in melting snow and ice, and easy to apply. The best ones also provide reduced corrosion to application equipment while also having beneficial effects to vegetation. All of these advantages in one ice melter have been a goal of the ice melting industry for some time.

Effective in melting means a product capable of melting below zero F. Ease of application is also important because labor cost is one of the largest components of melting snow and ice. Liquid melters bring ease to the application process.

In Ossian, Inc.'s earlier U.S. Pat. No. 5,683,619 (Ossian & Steinhauser), we created a product that melted below zero and could have a positive effect on vegetation. The major disadvantages to this earlier invention were the high cost to produce the product and cost of application. It used calcium chloride and urea in a dry melter composition. When calcium chloride is manufactured for industrial use it starts out as a liquid. The water is then evaporated to form a flake or pellet. This manufacturing process uses considerable energy adding to the cost of manufacture for the raw material. Some of this cost could be avoided if the ice melter were liquid as finished.

The solid ice melter of U.S. Pat. No. 5,683,619 is advantageous in that it is an effective melter, and brings a positive effect on vegetation. It is in content a combination of urea and calcium chloride in a solid particle format. In recent times it has been of interest to develop liquid ice melters. In some environments, liquid ice melters are preferred to solid ice melters in that they give better coverage, they are much quicker acting melters, and they are more economical to prepare.

The liquid ice melter of U.S. Pat. No. 7,122,127 is a product that is less expensive to manufacture, easy to use, melts below zero and can have a positive effect on vegetation. In that invention, we used liquid calcium chloride solution combined with either dry or liquid urea, in critical ratios to achieve an effective liquid ice melter.

The present inventor has invented both solid ice melters of the type described above and liquid ice melters of the type described above. Both have their useful approaches depending on the use, climate and conditions. One particularly preferred ice melter is the solid type ice melter of U.S. Pat. No. 6,039,890 which relates to a quick acting ice melter, its melt value enhanced by the addition of an ice melter compatible surface active agent. The present invention represents yet further improvement on the invention of U.S. Pat. No. 6,039,890 of Mar. 21, 2000 entitled "QUICK ACTING ICE MELTING COMPOSITION", Ossian et al. The disclosure of this patent is incorporated herein by reference.

In most general sense, the above-identified U.S. Pat. No. 6,039,890 uses a variety of different surfactant surface active agents as coatings of solid ice melters to achieve enhanced melt values and provide quicker melt action. The application of the present Applicant, Ossian, along with another joint inventor, U.S. Pat. No. 7,473,379 entitled "PROCESSED RAFFINATE MATERIAL FOR ENHANCING MELT VALUE OF DE-ICERS" involves addition of the product known as Raffinate to conventional liquid or solid ice-melters in order to further enhance melt value. The present invention may be used with the system of the previously incorporated by reference U.S. Pat. No. 6,039,890 or with the system of U.S. Pat. No. 7,473,379 to the extent it describes solid melters with Raffinate additives.

The most common and therefore least expensive solid ice melters are those based upon chemical salts that gradually dissolve and form a salt solution (brine) which lowers freezing point. Salts used are chloride or acetates salts of Group I or Group II metals, such as sodium, potassium, calcium and magnesium. These salts can then be combined with environmentally friendly organic materials to enhance their melt value such as urea.

In instances where chemical salts are used, these are generally white in color which blends completely in color with snow. It is at times desirable to add dyes to these chemical salts so that the person applying the deicer can easily distinguish areas where the deicer has been spread and areas where it has not. Typically used dyes are environmentally friendly water soluble, visible dyes of distinctly different colors than white.

The dye material must not be introduced into the deicer with water because the chemical salts as above described tend to be hygroscopic and the contact with contact with moisture will cause them to bridge or cake in the packages. This is of course undesirable. It affects their ability to spread, the amount of surface upon which they can effectively be used, and make them difficult to handle.

It has further been found and, indeed, my previous U.S. Pat. No. 6,039,890 addresses the speed of melting as a critical component for an effective deicer. The reason for this is quite simple. Ice on surfaces represents a risk and the quicker the ice is removed, the more effective the ice melter and thus the higher the value it has to the consumer.

Accordingly, it is a primary objective of the present invention to enhance melt value of conventional chemical salt deicers.

It is another objective of the present invention to enhance melt value using an environmentally friendly, water soluble material which will dissolve water soluble dyes.

Yet a further objective of the present invention is to provide a coating material on conventional chemical salt deicers which can apply not only ice melt value enhancement but also anti-caking and anti-bridging properties to allow for easier packaging and spreading of the deicer.

A further objective of the present invention is to find effective uses for industrial waste stream glycerin which is currently a glut on the market due to the current high popularity of bio-diesel fuel.

Another objective of the present invention is to provide the correct balance of salt fines and glycerin to achieve the correct anti-caking and anti-bridging properties.

A method and means for accomplishing each of the above objectives as well as others will become apparent from the detailed description of the invention which follows hereinafter.

BRIEF SUMMARY OF THE INVENTION

Solid ice melters are improved with an exterior coating of glycerin balanced to the correct critical level in comparison to salt fines which prevents caking and bridging and enhances melt value.

BRIEF DESCRIPTION OF THE DRAWINGS

FIG. 1 is a graph showing melt value increase with a glycerin coating on the solid ice melt composition surface.

DETAILED DESCRIPTION OF THE PREFERRED EMBODIMENT

It goes without saying that the ice melters of the present invention may be used alone or in combination with abrasives and absorbents, for example as described in the earlier incorporated by reference U.S. Pat. No. 6,039,890.

The deicer composition of the present invention is normally solid and is formed from a mixture by way of example of metal salts of alkaline and alkaline earth metals. Preferably with metal chloride salts and most preferably, the alkaline and alkaline earth metals, such as sodium chloride, potassium chloride, magnesium chloride and calcium chloride. Acetate salts may also be employed.

In its broadest process sense, these materials are mixed, then ground, screened for size and blended with any coating material, mixed and are then discharged into a packaging bin.

Ice melters work by attracting moisture from their surrounding environment and creating a liquid brine. This brine lowers the freezing point of water, and effectively dissolves ice and snow on contact until it becomes so diluted to a concentration where its freezing point is raised nearly to that of water. At this point in time, its effectiveness is gone. As is well known, ice melters work because the ice melting composition or brine lowers the temperature at which water will freeze. In ice melter compositions that do not contain surface active agents at the interface of the ice melter brine and the packed snow or ice, the molecules are attracted inward in accordance with natural principles of adhesion. However, it has now been discovered with the addition of surface active molecules as herein described, the adhesion attraction of like molecules of a liquid substance is quickly absorbed into the ice or packed snow, increasing significantly its melting speed. This is the invention of the '890 patent.

The critical component in the '890 patent ice melter invention is the surface active agent that reduces the surface tension in the melting brine produced by the various ice melting salts. This surface active agent must be able to reduce surface tension in high salt solution concentrations at temperatures below the freezing point of water. This is referred to as being ice melter compatible.

The complexity of measuring surface active agent's effects on surface tension when used with ice melting agents to increase melting volume and melting speed can be overwhelming at best. The surface tension will change with each salt, the concentration of that salt in the solution, and the temperature of the solution. In the melting process, the concentration of the salt is constantly changing because the melting process is one of constant dilution. Also, temperature could and often changes with each application. The colder the temperature, the greater the surface tension becomes. It becomes even more complex when combinations of various ice melting salts are used.

There are several agents that can be used to reduce surface tension. Some of the various possibilities include nonionic, anionic, cationic and amphoteric surfactants. For these surface active agents to be successful, they would exhibit superior wetting properties in a high salt solution of sodium chloride, calcium chloride, magnesium chloride, potassium chloride or urea, either individually or in combination.

The overall objective is to reduce the surface tension in a high salt brine solution. This will allow the dry salt to convert to a liquid melting brine faster to increase the melt volume and the melting speed of the ice melting salt.

In the past, chemical salt based solid deicers often incorporated a dye for visibility. This was done by adding it to propylene glycol which was mixed with the other materials. Propylene glycol was used because one would normally not want to add water to a chemical salt based deicers, since the water would accentuate and accelerate caking and bridging. It has now been discovered that if the herein described levels of glycerin are used to dissolve the dye, then the dye and glycerin mixture or even glycerin alone can be used as coating on the solid mix with surprising results. Among its advantages, it is cheaper than propylene glycol; it has the advantage of being an anti-caking agent; and surprisingly it also enhances melt value.

Ice melting salts such as sodium chloride or blends of sodium chloride, calcium chloride, and magnesium chloride by their nature will congeal and cake. This is a major safety issue with salt storage in larger storage areas. The salt may bridge, only to give away later potentially causing injury or even death to someone who could be buried by the landslide effect of the salt pile. Such salt piles are common at city storage areas.

Caking and congealing of salt or salt blends is also a major problem in packaged containers. Over time the material packs from the pressure of being piled on top of other bags. Add to this that salt is slightly hygroscopic and this drawing moisture action will lead to caking and bridging not only in bulk storage but as well in bag storage, such as at stores.

Glycerin added in the herein described percentage as an exterior coating will decrease the caking of salt in either bulk storage or bag storage and will increase melt value.

Increasing melt value of salt is a goal of users in the field. Increasing the melt value of salt will reduce the quantity of salt being used. Reducing the amount of salt usage has long been a goal of users in the industry. In U.S. Pat. No. 6,039,890, we introduced the concept of coating salt with surfactants to increase melt value. This has been very effective and millions of pounds of product have been used employing this technique. This percentage level glycerin coating improves it further.

Glycerin may be coated alone or coated on top of a surfactant coated material and may be coated as glycerin in pure form or by product glycerin and may be mixed with visible dye or not mixed with visible dye, as the applicator wishes. An important feature is the percentage level of glycerin used. Generally speaking, the amount of glycerin can be from 0.5% to 4.0% by the total weight of the ice melt composition. The volume of glycerin used will largely be determined by the quantity of salt fines. Fines are defined here by the percentage of the total salt mixture that passes through #10 U.S. Screen. The more fines in the salt mixture the more exposed surface area would be expected. Salt fines are a major contributor to caking and bridging of salt in bulk piles and packaged. For glycerin to provide anti-caking value it is helpful to coat the available surface area of the salt. Coarse salt containing minimal amount of fines would require 0.5% to 1.0%. Coarse salt would be defined here as that salt mixture that would not pass through #10 U.S. Screen. A mixture of 50% coarse and 50% fines would require 2.0% glycerin. The objective is to thoroughly coat the salt mixture based on the screen sizing of the salt. To increase levels beyond those listed would likely lead to run-off and leaching issues. But, the minimum level here described is needed to be effective. Generally the finer the salt material, the more glycerin is needed.

A summary of glycerin requirements based on salt screening follows:

Coarse Salt—½ to 1 gallon Glycerin coating (0.5% to 1.0% by weight) per 1000 lbs. of salt.

| Typical Screen Range | | |
|---|---|---|
| U.S. Screen ½" | 0 to 24% | percentage cumulative |
| U.S. Screen ⅜" | 3 to 45% | percentage cumulative |
| U.S. Screen ¼" | 16 to 45% | percentage cumulative |
| U.S. Screen # 4 | 38 to 85% | percentage cumulative |
| U.S. Screen # 7 | 63 to 95% | percentage cumulative |
| U.S. Screen # 10 | 83 to 99% | percentage cumulative |
| U.S. Screen # 18 | 95 to 100% | percentage cumulative |

Medium Salt—1 to 2 gallon Glycerin coating (1.0% to 2.0% by weight) per 1000 lbs. of salt.

| Typical Range | | |
|---|---|---|
| U.S. Screen # 6 | 10 to 40% | percentage cumulative |
| U.S. Screen # 8 | 10 to 40% | percentage cumulative |
| U.S. Screen # 10 | 10 to 40% | percentage cumulative |
| Pan | 0 to 10% | percentage cumulative |

Fine Salt—2 to 4 gallon Glycerin coating (2.0% to 4.0% by weight) per 1000 lbs. of salt.

| Typical Range | | |
|---|---|---|
| U.S. Screen # 12 | 10 to 40% | percentage cumulative |
| U.S. Screen # 14 | 10 to 40% | percentage cumulative |
| U.S. Screen # 18 | 10 to 40% | percentage cumulative |
| Pan | 0 to 20% | percentage cumulative |

The following are typical industrial specifications for preparing a product which is both the '890 patent and the present improvement all in the same ice melter.

Production Specifications—Procedures for Blue Dye plus Surfactant mixes:
1. Begin with an empty tank;
2. Add 160 gallons (1,648 lbs.) Glycerin;
3. Add 4500 grams of blue polymeric colorant
4. Mix with mixer blades
5. Add 40 gallons (350 lbs.) 8 mol nonionic surfactant
6. Mix with mixer blades
7. Mix with prop prior to adding to the blender/mixer.

One gallon of dye will weigh approximately 9.5 lbs. per gallon.

The above mix could be repeated using just the glycerin. The ratio would be 4500 grams of polymeric colorant to 200 gallons of glycerin.

The dye mixture is added to salt as a coating process in a blender/mixer/coating auger. The dye mixture ratio may vary per product. The glycerin and nonionic surfactant may vary per product. A typical production example follows:

Product Specifications—Procedures for dye coating
1. Begin with an empty and clean blender;
2. Add 5000 lbs. of screened medium salt (through #4 and on #10)
3. Add 3½ gallons Blue Dye Surfactant mix;
4. Add 5000 lbs. of screened medium salt (through #4 and on #10)
5. Add 3½ gallons Blue Dye Surfactant mix;
6. Let mixer run approximately two minutes, discharge into packaging bin.

The small weight percentages of the glycerin, surfactant and coating used in the above 10,000 pound batch are as follows:

| | |
|---|---|
| Glycerin content: | .005768 |
| Nonionic surfactant content: | .001225 |
| Polymeric colorant: | .000035 |

The typical ranges of the above will vary depending on the specific product and the fines content of the salt in the mixture, but for the most part will fall into the following ranges:

| | |
|---|---|
| Glycerin content: | from .005 to .04 |
| Nonionic surfactant: | from .001 to .002 |
| Polymeric colorant: | from .00001 to .0001 |

The polymeric colorant can be any suitable water soluble environmentally friendly dye. It can for example be Liquitinit (trade mark) Brilliant Orange, Liquitinit (trademark) Pink AL, Liquitinit (trade mark) Green HMC, and Liquitinit (trade mark) Patent Blue. The dyes can be purchased from Milliken Chemical, 1440 Campton Road, Inman, S.C. 29349.

The following example and test are offered to further illustrate but not limit the process and product of the present invention.

EXAMPLE

To test the value of glycerin, glycerin from bio-diesel production was tested as below described:

Sample A and Sample B

Dried Solar Salt was screened through a #4 U.S. screen to eliminate large particles and balance was kept on a #10 U.S. screen to eliminate fines. Fines tend to increase caking issues. Sample A was weighted out to 1000 grams and water was added to equal 1 percent. Sample B was weighted out to 1000 grams and glycerin was added to equal 1 percent. After the glycerin coating to Sample B water was added to equal 1 percent. This was the same sample amount of water that was added to Sample A. Both samples were placed in a lab oven at 120 degrees F. for ten days to accelerate caking issues from summer heat.

Results

After ten days the two samples were removed from the lab oven with the following results:

Sample A—hard cake—would not flow
Sample B—free flowing

From the results observed above, we concluded percentages of glycerin either pure or from bio-diesel fuel production waste stream can significantly reduce caking of sodium chloride in storage. This knowledge was used to set up melt value tests.

Using the Strategic Highway Research Program (SHRP) H-205.1 standards for testing ice melters the following samples were placed in a laboratory controlled freezer and melt values established for 20 minutes at 15 degrees F. The test was repeated three times for the untreated sample and three times for the treated sample with averages plotted on the graph of FIG. 1.

All samples were tightly screened through #8 US Screen and on #6 US Screen. No fines were present in the samples tested. One set of three samples was not treated as a control and the other three samples were coated with 1 percent glycerin.

Samples #1 through #4—sodium chloride
Samples #5 through #6—sodium chloride coated with 1 percent glycerin From the above example, it is seen that the present invention has demonstrated that glycerin from bio-diesel production and used in percentages from 0.5% to 4.0% will reduce caking and bridging in storage of sodium chloride. The ice melting tests (FIG. 1) have shown glycerin coated sodium chloride or blends of sodium chloride with additional ice melting agents in small percentages will increase melt value. In addition, glycerin can enhance the dye mix process commonly used in ice melters without causing caking and bridging. Glycerin replaces the water and/or propylene glycol that are added as the carrier for dye mixes that are used to coat ice melting salts. Glycerin dye mixes may also be blended with surfactants prior to coating the ice melting salts, as discussed above.

Further as can be seen as a general trend, the more finer, the more glycerin is required. Correspondingly, the more coarse and less finer composition requires less glycerin. Fines tend to increase caking issues that need to be dealt with to maintain caking and bridging properties within the range of acceptable de-icer qualities.

What is claimed:
1. A solid ice melt composition, comprising:
   a solid ice melter;
   salt fines which are selected from the group consisting of coarse salt fines, medium salt fines, and fine grade salt fines;
   a small but anti-caking and melt value enhancing and salt fines coating effective amount of an exterior ice melting surface coating of glycerin, coating said salt fines present to enhance ice melt and minimize caking and bridging; and
   when said salt fines are coarse salt fines the glycerin is in the range of from 0.5% to 1.0%, and when said salt fines are medium salt fines, glycerin is in the range of about 1.0% to about 2.0% and wherein the salt fines are fine grade salt fines the amount of glycerin is within the range of about 2% to about 4%.

2. The solid ice melt composition of claim 1 wherein the coating is a mixture of glycerin and a water soluble environmentally friendly visible dye.

3. The solid ice melt composition of claim 1 wherein the glycerin is agricultural grade glycerin derived from an industrial waste stream.

4. The solid ice melt composition of claim 3 wherein the industrial waste stream source of glycerin is selected from the group of industrial processes of transesterification, saponification and hydrolysis.

5. The solid ice melt composition of claim 4 wherein the industrial waste stream source of glycerin is from biodiesel fuel production.

6. The solid ice melt composition of claim 2 wherein the glycerin and water soluble environmentally friendly dye is selected from the group consisting of biodegradable polymeric colorants.

7. The solid ice melt composition of claim 1 which is a salt based ice melt.

8. The solid ice melt composition of claim 1 wherein the salts are selected from the group consisting of chloride and acetate salts.

9. The solid ice melt composition of claim 8 wherein the salts are selected from the group consisting of sodium chloride, potassium chloride, magnesium chloride, calcium acetate, magnesium acetate, potassium acetate and sodium acetate.

10. The solid ice melt composition of clam 1 which includes sugar derived agriculture by products of cane, beet and corn sugar production.

* * * * *